United States Patent
Wang et al.

(10) Patent No.: US 11,867,640 B2
(45) Date of Patent: Jan. 9, 2024

(54) DEFECTIVE SOLDERING POINT INTENSIVE EXTENT ANALYSIS SYSTEM FOR SOLDER PASTE INSPECTION AND METHOD THEREOF

(71) Applicants: Inventec (Pudong) Technology Corporation, Shanghai (CN); Inventec Corporation, Taipei (TW)

(72) Inventors: Fu-Li Wang, Shanghai (CN); Li Yu, Shanghai (CN)

(73) Assignees: Inventec (Pudong) Technology Corporation, Shanghai (CN); Inventec Corporation, Taipei (TW)

( * ) Notice: Subject to any disclaimer, the term of this patent is extended or adjusted under 35 U.S.C. 154(b) by 553 days.

(21) Appl. No.: 17/127,928

(22) Filed: Dec. 18, 2020

(65) Prior Publication Data

US 2022/0163461 A1 May 26, 2022

(30) Foreign Application Priority Data

Nov. 24, 2020 (CN) .......................... 202011327371.2

(51) Int. Cl.
*G01N 21/95* (2006.01)
(52) U.S. Cl.
CPC .................................. *G01N 21/951* (2013.01)

(58) Field of Classification Search
CPC ...................................................... G01N 21/951
USPC ............................................................. 702/81
See application file for complete search history.

(56) References Cited

U.S. PATENT DOCUMENTS

| | | | |
|---|---|---|---|
| 2004/0218808 A1* | 11/2004 | Prince | H05K 3/1216 382/150 |
| 2019/0364666 A1* | 11/2019 | Lee | B41F 15/34 |
| 2020/0225279 A1* | 7/2020 | Zhao | G01R 31/2815 |
| 2020/0292471 A1* | 9/2020 | Xia | G06T 7/001 |

* cited by examiner

*Primary Examiner* — Ricky Go
(74) *Attorney, Agent, or Firm* — David R. Stevens; Stevens Law Group (57) ABSTRACT

A defective soldering point intensive extent analysis system for solder paste inspection and a method thereof are disclosed. After the circuit board is set with soldering pastes, the solder paste inspection can immediately detect a circuit board to generate a detection log, the information of defective soldering points in the detection log is analyzed to determine an aggregate of the defective soldering points set on the circuit board, so as to find a defective soldering point area, and generate and display defective soldering point alert information according to statistics of the defective soldering point area, thereby achieving the technical effect of conveniently analyzing the defective soldering points on the circuit board for accurate repair.

8 Claims, 9 Drawing Sheets

| Defective soldering point area 411 | Name of electronic component 412 | Type of defective soldering point 413 |
|---|---|---|
| (361,102) (372,114) | U63, U62, U64 | Under Height, Under Volume |
| (286,563) (318,551) | U_IDRAC9_DRAM1 | Over Volume |
| (594,476) (619,459) | U73, C2204 | Under Height, Under Volume |

| Location of defective soldering point area 414 | Size of defective soldering point area 415 | Soldering pad information 416 |
|---|---|---|
| Top middle part | Large | Small |
| Bottom middle part | Small | Large |
| Right part | Small | Small |

FIG. 4

| Defective soldering 422 point area | 421 Detection log generation time | Name of electronic 423 component |
|---|---|---|
| (362,113) (371,105) | 2020/10/4 15:07:52 | U63, U64 |

| Type of defective 424 soldering point | Height | Volume | Size |
|---|---|---|---|
| Under Height, Under Volume | 425 | 426 | 427 |

| X coordinate offset | X coordinate offset |
|---|---|
| 428 | 429 |

| Location of the 431 defective soldering point area | Size of the defective 432 soldering point area | Soldering pad 433 information |
|---|---|---|
| Top middle part | Large | Small |

DEFECTIVE SOLDERING POINT INTENSIVE EXTENT ANALYSIS SYSTEM FOR SOLDER PASTE INSPECTION AND METHOD THEREOF

BACKGROUND OF THE INVENTION

1. Field of the Invention

The present invention provides an intensive extent analysis system and a method thereof, and more particularly to a defective soldering point intensive extent analysis system for a solder paste inspection and a method thereof. In the defective soldering point intensive extent analysis system, a detection log provided by the solder paste inspection is analyzed to find a defective soldering point area, so as to generate a defective soldering point alert information according to statistics of the information of defective soldering points within the defective soldering point area.

2. Description of the Related Art

The solder paste inspection widely used in surface assembly production lines is able to detect a circuit board immediately after the circuit board is set (coated) with solder pastes, so as to determine whether the soldering pastes set on the circuit board are qualified, for further screening operation.

In an existing process, when the circuit board is determined as unqualified after the immediate detection of the solder paste inspection, the defective soldering points on the circuit board are inspected in visual and repaired manually, and the above-mentioned existing process for the defective soldering points on the circuit board causes lower production efficiency and higher labor costs.

Therefore, what is needed is to develop an improved technical solution to solve the conventional technical problem that it is inconvenient to inspect and repair the circuit board determined to be unqualified by immediate detection of the solder paste inspection.

SUMMARY OF THE INVENTION

In order to solve the conventional technical problem that it is inconvenient to inspect and repair the unqualified circuit board determined by immediate detection of solder paste inspection, the present invention provides a defective soldering point intensive extent analysis system for solder paste inspection and a method thereof.

According to an embodiment, the present invention provides a defective soldering point intensive extent analysis system for a solder paste inspection, wherein the solder paste inspection is configured to immediately detect a circuit board to generate a detection log after the circuit board is set with soldering paste, the detection log comprises information of defective soldering points of the detected circuit board, the solder paste inspection stores soldering pad information corresponding to the detected circuit board, the soldering pad information comprises information of soldering point set areas, and the defective soldering point intensive extent analysis system includes a receiving module, an intensive extent analysis module, an aggregate module, a generation module and a display module. The receiving module is configured to receive the detection log and the soldering pad information from the solder paste inspection. The intensive extent analysis module is configured to select one of the defective soldering points in the detection log as a center in sequential order, and use a preset aggregate radius as a determination range to determine whether the number of the defective soldering points within the determination range is higher than or equal to a preset number. The aggregate module is configured to set the defective soldering points corresponding to the determination ranges as the same aggregate to find at least one defective soldering point area when the number of the defective soldering points within the determination range is higher than or equal to the preset number and the determination ranges have overlapped portions formed therebetween. The generation module is configured to generate defective soldering point alert information according to statistics of the information of defective soldering points within the at least one defective soldering point area, a location and a size of the at least one defective soldering point area, and the soldering pad information. The display module is configured to display the defective soldering point alert information in a table.

According to an embodiment, the present invention provides a defective soldering point intensive extent analysis method for a solder paste inspection, wherein the solder paste inspection immediately detects a circuit board to generate a detection log after the circuit board is set with soldering paste, the detection log comprises information of defective soldering points of the detected circuit board, the solder paste inspection stores soldering pad information corresponding to the detected circuit board, the soldering pad information comprises information of soldering point set areas, and the defective soldering point intensive extent analysis method comprising steps of: receiving the detection log and the soldering pad information from the solder paste inspection: selecting one of defective soldering points in the detection log as a center in sequential order, and using a preset aggregate radius as a determination range to determine whether the number of the defective soldering points within the determination range is higher than or equal to a preset number; setting the defective soldering points corresponding to the determination range as the same aggregate to find at least one defective soldering point area when the number of the defective soldering points within the determination range is higher than or equal to the preset number and the determination ranges have overlapped portions formed therebetween; generating defective soldering point alert information according to statistics of the information of defective soldering points within the at least one defective soldering point area, a location and a size of the at least one defective soldering point area, and the soldering pad information; and displaying the defective soldering point alert information in a table.

According to the above-mentioned contents, the difference between the system and method of the present invention and the conventional technology is that in the present invention the solder paste inspection immediately detects the circuit board to generate the detection log after the circuit board is set with soldering pastes, and the information of defective soldering points in the detection log is analyzed to determine the aggregate of defective soldering points set on the circuit board and find the at least one defective soldering point area, so as to generate and display the defective soldering point alert information according to statistics of the at least one defective soldering point area.

Aforementioned technical solution of the present invention can achieve the technical effect of conveniently analyzing the defective soldering point on the circuit board for accurate repair.

BRIEF DESCRIPTION OF THE DRAWINGS

The structure, operating principle and effects of the present invention will be described in detail by way of various embodiments which are illustrated in the accompanying drawings.

DETAILED DESCRIPTION OF THE PREFERRED EMBODIMENTS

The following embodiments of the present invention are herein described in detail with reference to the accompanying drawings. These drawings show specific examples of the embodiments of the present invention. These embodiments are provided so that this disclosure will be thorough and complete, and will fully convey the scope of the invention to those skilled in the art. It is to be acknowledged that these embodiments are exemplary implementations and are not to be construed as limiting the scope of the present invention in any way. Further modifications to the disclosed embodiments, as well as other embodiments, are also included within the scope of the appended claims.

These embodiments are provided so that this disclosure is thorough and complete, and fully conveys the inventive concept to those skilled in the art. Regarding the drawings, the relative proportions and ratios of elements in the drawings may be exaggerated or diminished in size for the sake of clarity and convenience. Such arbitrary proportions are only illustrative and not limiting in any way. The same reference numbers are used in the drawings and description to refer to the same or like parts. As used herein, the singular forms "a", "an" and "the" are intended to include the plural forms as well, unless the context clearly indicates otherwise.

It is to be acknowledged that, although the terms 'first', 'second', 'third', and so on, may be used herein to describe various elements, these elements should not be limited by these terms. These terms are used only for the purpose of distinguishing one component from another component. Thus, a first element discussed herein could be termed a second element without altering the description of the present disclosure. As used herein, the term "or" includes any and all combinations of one or more of the associated listed items.

It will be acknowledged that when an element or layer is referred to as being "on," "connected to" or "coupled to" another element or layer, it can be directly on, connected or coupled to the other element or layer, or intervening elements or layers may be present. In contrast, when an element is referred to as being "directly on," "directly connected to" or "directly coupled to" another element or layer, there are no intervening elements or layers present.

In addition, unless explicitly described to the contrary, the word "comprise" and variations such as "comprises" or "comprising", will be acknowledged to imply the inclusion of stated elements but not the exclusion of any other elements.

The defective soldering point intensive extent analysis system of the present invention is described in following paragraphs. Please refer to FIG. 1, which is a system block diagram of a defective soldering point intensive extent analysis system for solder paste inspection, according to the present invention.

Figure 1:
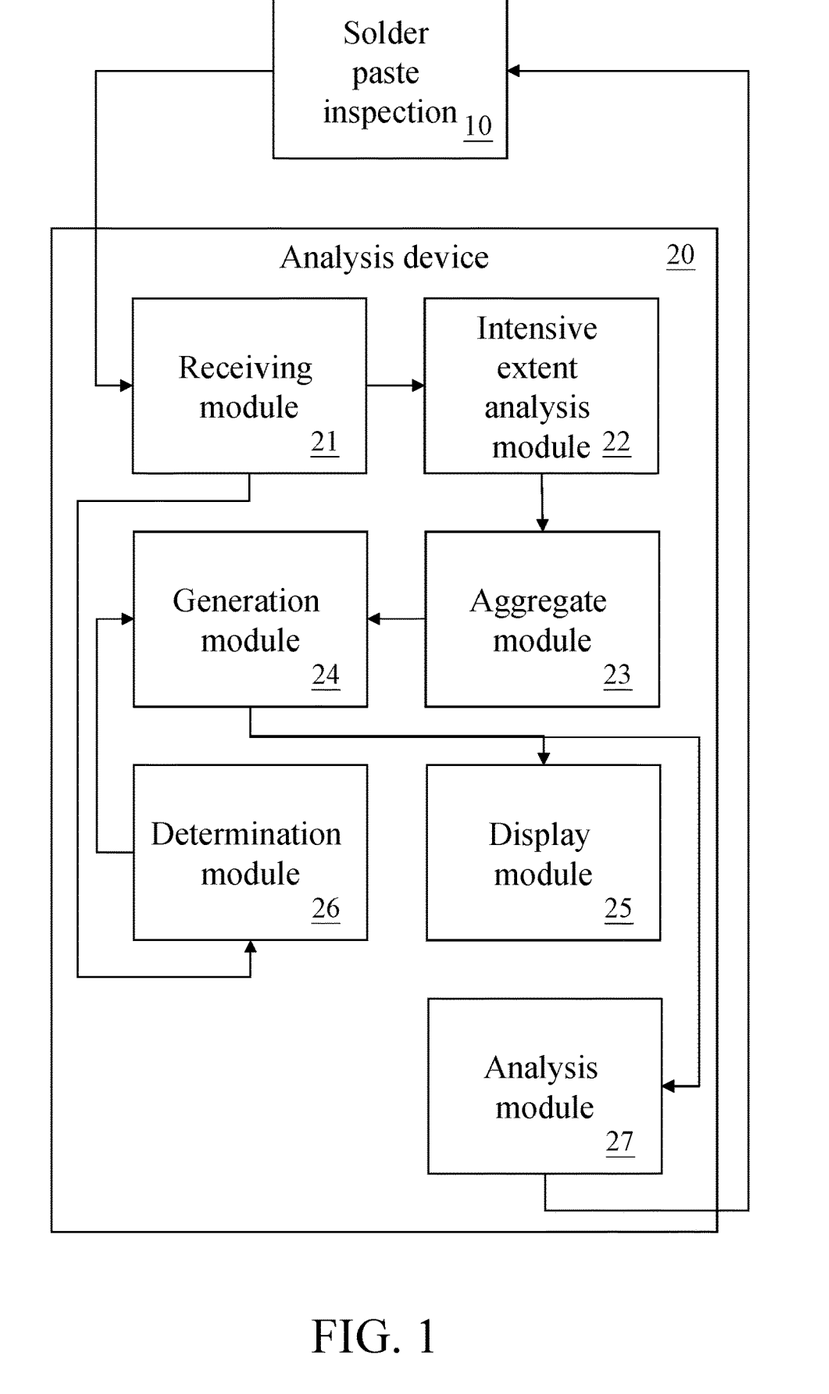
FIG. 1 is a system block diagram of a defective soldering point intensive extent analysis system for solder paste inspection, according to the present invention.

According to the defective soldering point intensive extent analysis system of the present invention, solder paste inspection (SPI) 10 can immediately detect a circuit board to generate a detection log after the circuit board is set (or coated) with soldering pastes, the detection log includes an information of defective soldering points of the detected circuit board, and the solder paste inspection 10 stores soldering pad information corresponding to the circuit board. The soldering pad information includes information of soldering point set areas. As shown in FIG. 1, the defective soldering point intensive extent analysis system includes a receiving module 21, an intensive extent analysis module 22, an aggregate module 23, a generation module 24 and a display module 25. In an embodiment, the receiving module 21, the intensive extent analysis module 22, the aggregate module 23, the generation module 24 and the display module 25 are performed in an analysis device 20. The aforementioned soldering point set area information includes, for example, position information of soldering point setting areas and size information of the soldering point setting areas: however, these examples are merely for exemplary illustration, and application field of the present invention is not limited thereto.

The analysis device 20 and the solder paste inspection 10 can be interconnected through a wired transmission manner or a wireless transmission manner; for example, the wired transmission manner can be a power line network, an optical network; and the wireless transmission manner can be Wi-Fi, mobile communication network such as 3G, 4G, 5G and so on; however, these examples are merely for exemplary illustration, and the application field of the present invention not limited thereto.

After the solder paste inspection 10 generates the detection log, the receiving module 21 can receive the detection log from the solder paste inspection 10. After the receiving module 21 receives the detection log from the solder paste inspection 10, the intensive extent analysis module 22 selects each of defective soldering points in the detection log as a center in sequential order and use a preset aggregate radius as a determination range, to determine whether the number of the defective soldering points within the determination range is higher than or equal to a preset number. It should be noted that the intensive extent analysis module 22 can further determine whether the defective soldering point within the determination range is a noise point, when the position of the defective soldering point within the determination range does not match the soldering point set area information contained in the soldering pad information, the intensive extent analysis module 22 defines the defective soldering point as the noise point. However, these examples are merely for exemplary illustration, and application field of the present invention is not limited thereto. When the intensive extent analysis module 22 determines that the defective soldering point within the determination range is a noise point, the intensive extent analysis module 22 deletes the defective soldering point determined as noise point, so as to prevent from generating a wrong analysis result.

Figure 2:
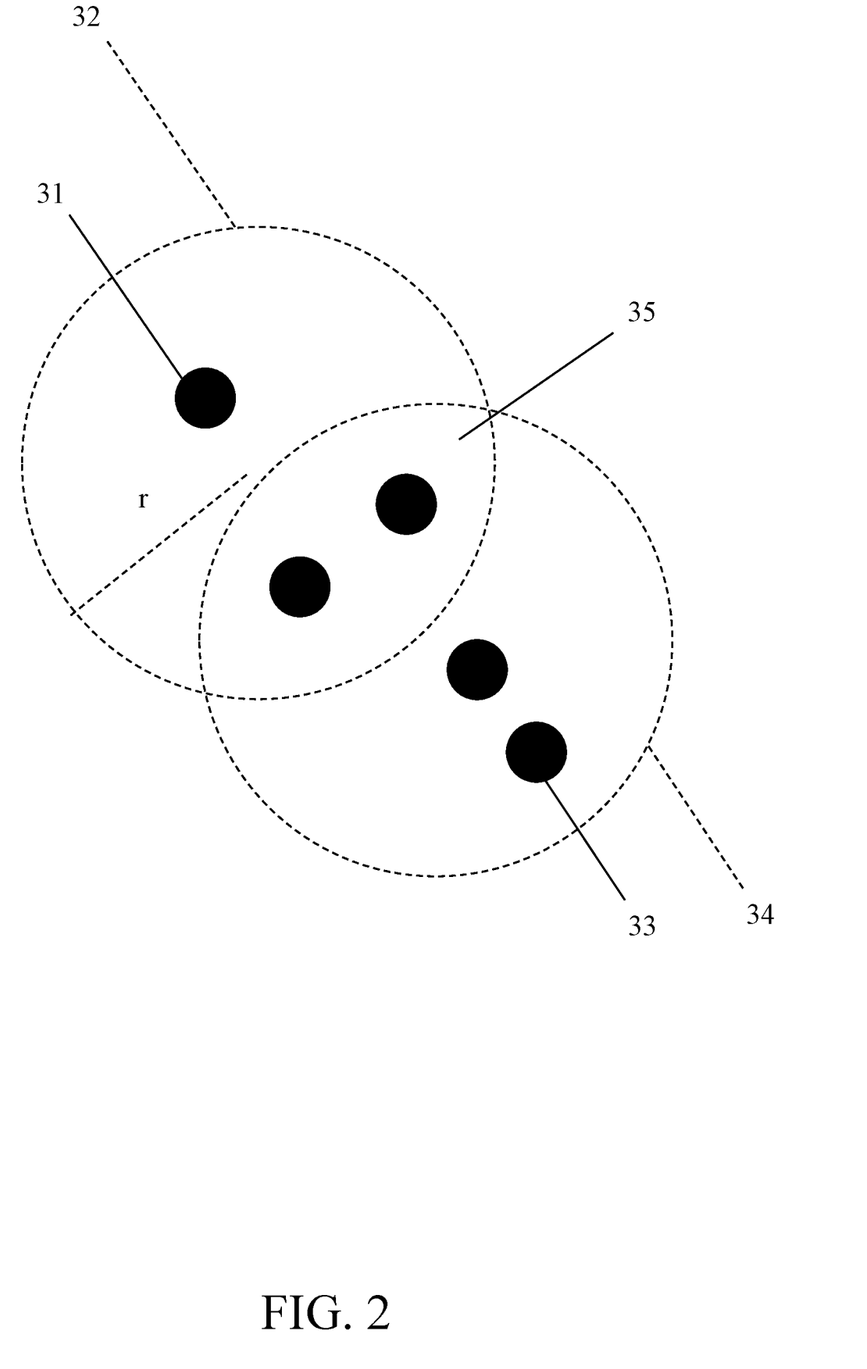
FIG. 2 is a schematic view showing defective soldering points and a determination range of defective soldering point intensive extent analysis for the solder paste inspection, according to the present invention.

Please refer to FIG. 2, which is a schematic view showing defective soldering points and a determination range of defective soldering point intensive extent analysis for the solder paste inspection, according to the present invention.

As shown in FIG. 2, the intensive extent analysis module 22 selects the first coordinate position 31 of the first defective soldering point in the detection log, and use a preset aggregate radius "r" to define a first determination range 32, and when the number of the defective soldering points set within the first determination range 32 is three, the intensive extent analysis module 22 can determine that the number of the defective soldering points set within the first determination range 32 is higher than a preset number of two. This example is merely for exemplary illustration, and application field of the present invention is not limited thereto.

Next, the intensive extent analysis module 22 can select a second coordinate position 33 of the second defective soldering point in the detection log and use the preset aggregate radius "r" to define a second determination range 34, when the number of the defective soldering points set within the second determination range 32 is four, the intensive extent analysis module 22 can determine that the number of the defective soldering points within the second determination range 34 is higher than the preset number of two. This example is merely for exemplary illustration, and application field of the present invention is not limited thereto.

Next, when the number of the defective soldering points within each of the defined determination ranges is higher than or equal to the preset number and overlapped portions are formed between the defined determination ranges, the aggregate module 23 sets the defective soldering points within the determination ranges to be in same aggregate, so as to find a defective soldering point area. The aggregate module 23 can find at least one defective soldering point area according to the coordinate positions of defective soldering points in the same aggregate.

Figure 3:
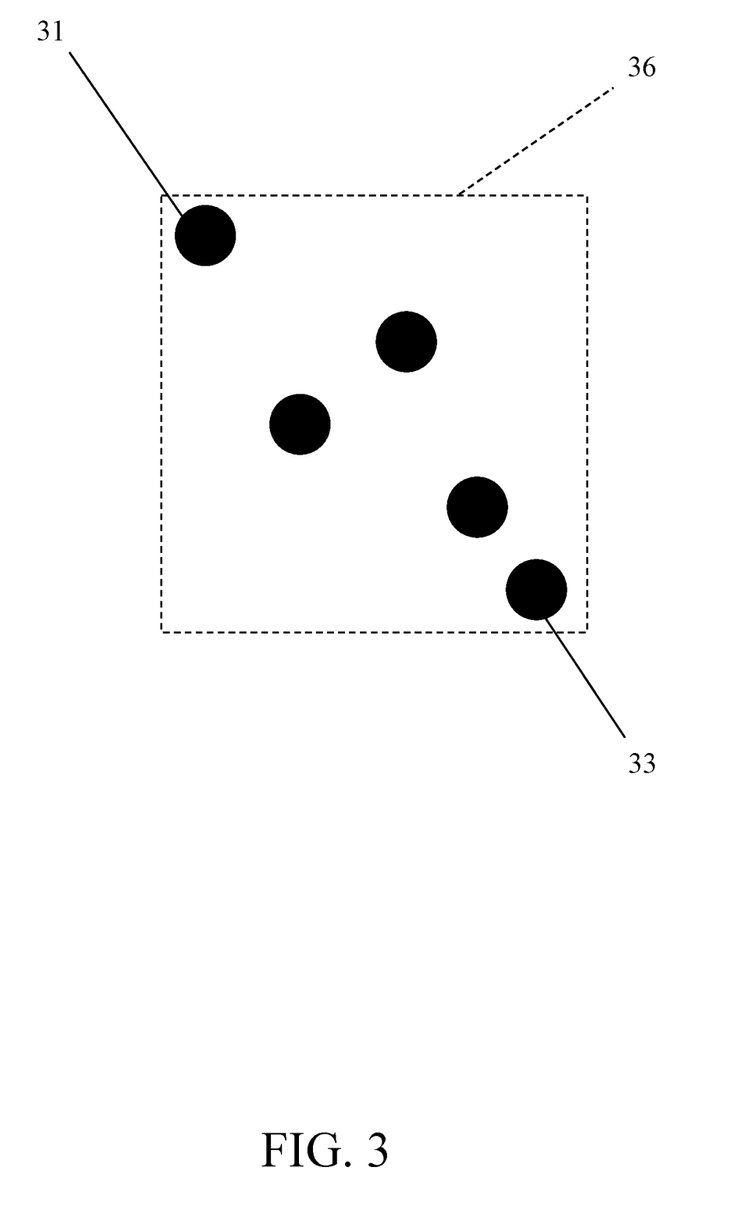
FIG. 3 is a schematic view showing the at least one defective soldering point area of defective soldering point intensive extent analysis for the solder paste inspection, according to the present invention.

Please refer to FIG. 3, which is a schematic view showing the at least one defective soldering point area found in defective soldering point intensive extent analysis for the solder paste inspection, according to the present invention. As mentioned above example, the intensive extent analysis module 22 determines the number of the defective soldering points within the first determination range 32 is more than the preset number of two and the number of the defective soldering points within the second determination range 34 is more than the preset number of two, and the first determination range 32 and the second determination range 34 have the overlapped portions 35 formed therebetween, so the aggregate module 23 sets the first defective soldering point and the second defective soldering point as the same aggregate. After the aggregate module 23 completes the process of setting the defective soldering points as the aggregate, the aggregate module 23 sets the coordinate range of the aggregate, for example, when the coordinate positions of the defective soldering points in the aggregate located at the most edge are (361,102) and (372,114), the aggregate module 23 can set the coordinate range of the defective soldering point area 36 to be the range of from (361,102) to (372,114). It should be noted that the rectangle shown in FIG. 3 is merely for exemplary illustration of the defective soldering point area 36, and the shape of the defective soldering point area 36 can be determined upon practical demand, the corresponding shape can be calculated based on the coordinate positions, and application field of the present invention is not limited thereto.

Figure 4:
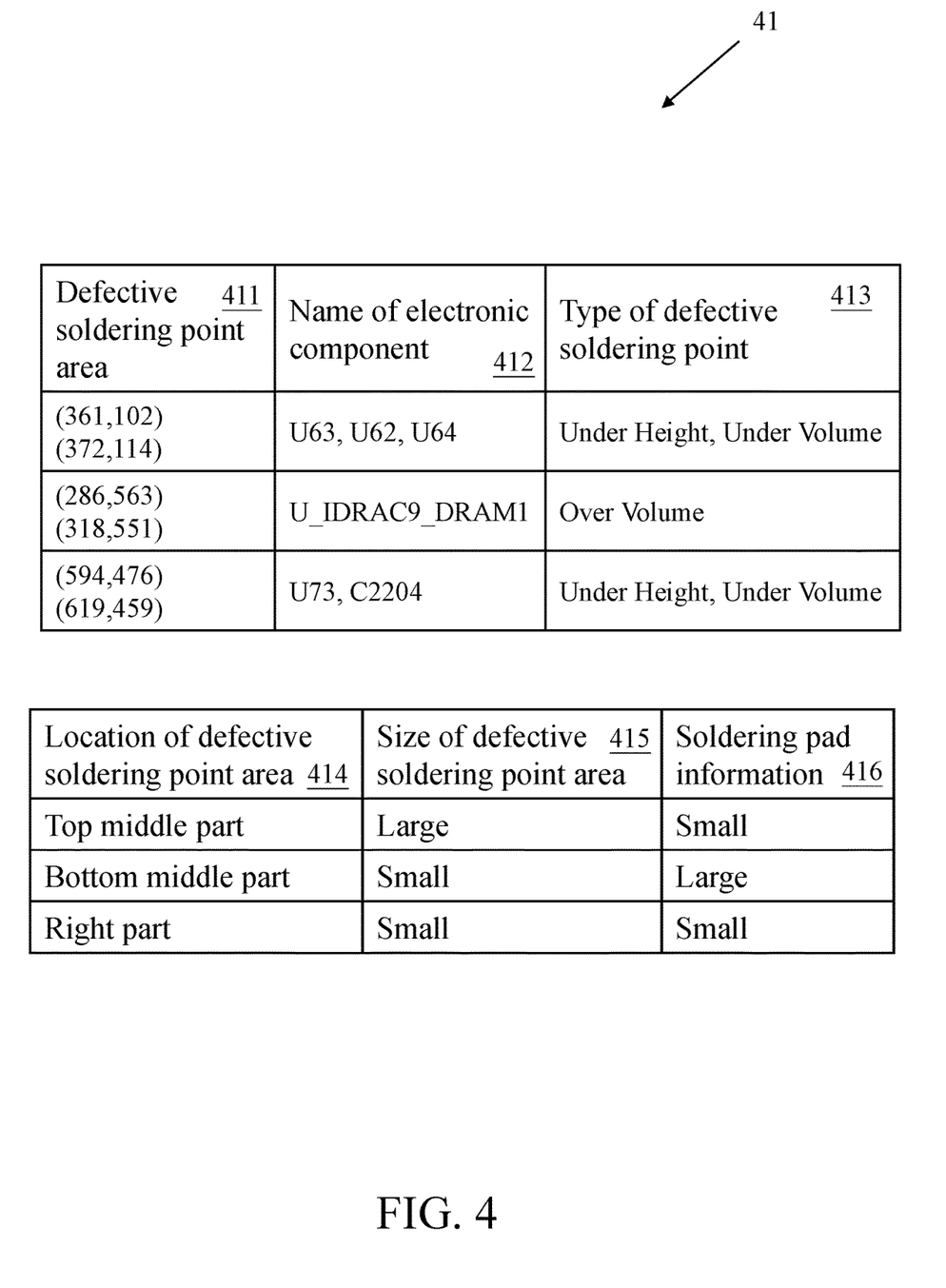
FIG. 4 is a schematic view of defective soldering point alert information generated in defective soldering point intensive extent analysis for solder paste inspection, according to the present invention.

Next, the generation module 24 can generate defective soldering point alert information 41 according to statistics of the information of the defective soldering points within the defective soldering point area, and the location and the size of defective soldering point area, and the soldering pad information. FIG. 4 is a schematic view of the defective soldering point alert information 41 generated in the defective soldering point intensive extent analysis for solder paste inspection, according to the present invention. As shown in FIG. 4, the defective soldering point alert information 41 includes data about the defective soldering point area 411, the name of electronic component 412 soldered on the defective soldering point area, the type 413 of defective soldering point, the location 414 of defective soldering point area, the size 415 of defective soldering point area, and soldering pad information 416. The defective soldering point area 411, the name of electronic component 412 and the defective soldering point type 413 can be obtained from the detection log, the defective soldering point area location 414 means that the defective soldering point area is located at which positional part of the circuit board, for example, the circuit board can be divided into nine positional parts including a top right part, a top middle part, a top left part, a right part, a middle part, a left part, a bottom right part, a bottom middle part and a bottom left part. The defective soldering point area location 414 is one of the aforementioned nine positional parts, the defective soldering point area size 415 can be calculated based on the coordinate positions of the defective soldering points and compared with the size information corresponding to the soldering point set area information contained in the soldering pad information, so as to determine that the practical size of the defective soldering point area is higher than or lower than the size contained in the soldering point set area information, thereby determining the content of the defective soldering point area size 415 to be large or small. The soldering pad information 416 is shown as large or small according to the content in the soldering point set area information. It should be noted that the above-mentioned examples are merely for exemplary illustration, and application field of the present invention is not limited thereto. The display module 25 can display the defective soldering point alert information 41 in a table. In an embodiment, the defective soldering point intensive extent analysis system can further include an analysis module 27 configured to perform analysis and recognition on the at least one defective soldering point area in the defective soldering point alert information 41, to summarize features of the defective soldering points in the at least one defective soldering point area, so as to analyze causes of the defective soldering points, and feed the causes back to the solder paste inspection 10.

In an embodiment, the analysis device 20 of the present invention includes a determination module 26 configured to determine whether similar defective soldering point areas exist the successive N detection logs, and N is a positive integer higher than or equal to 2. The aforementioned similar defective soldering point areas indicates that the defective soldering point areas analyzed in the detection logs have overlapped areas formed therebetween, and an overlapping ratio of the overlapped area is higher than or equal to a preset ratio.

When the determination module 26 determines that the N successive detection logs have similar defective soldering point areas, the generation module 24 generates defective soldering point versus time analysis alert information 42 according to statistics of information of the defective soldering points within the at least one defective soldering point area based on times of generating the N detection logs. Please refer to FIG. 5, which is a schematic view of the defective soldering point versus time analysis alert information 42 generated in the defective soldering point intensive extent analysis for the solder paste inspection, according to the present invention.

Figure 5:
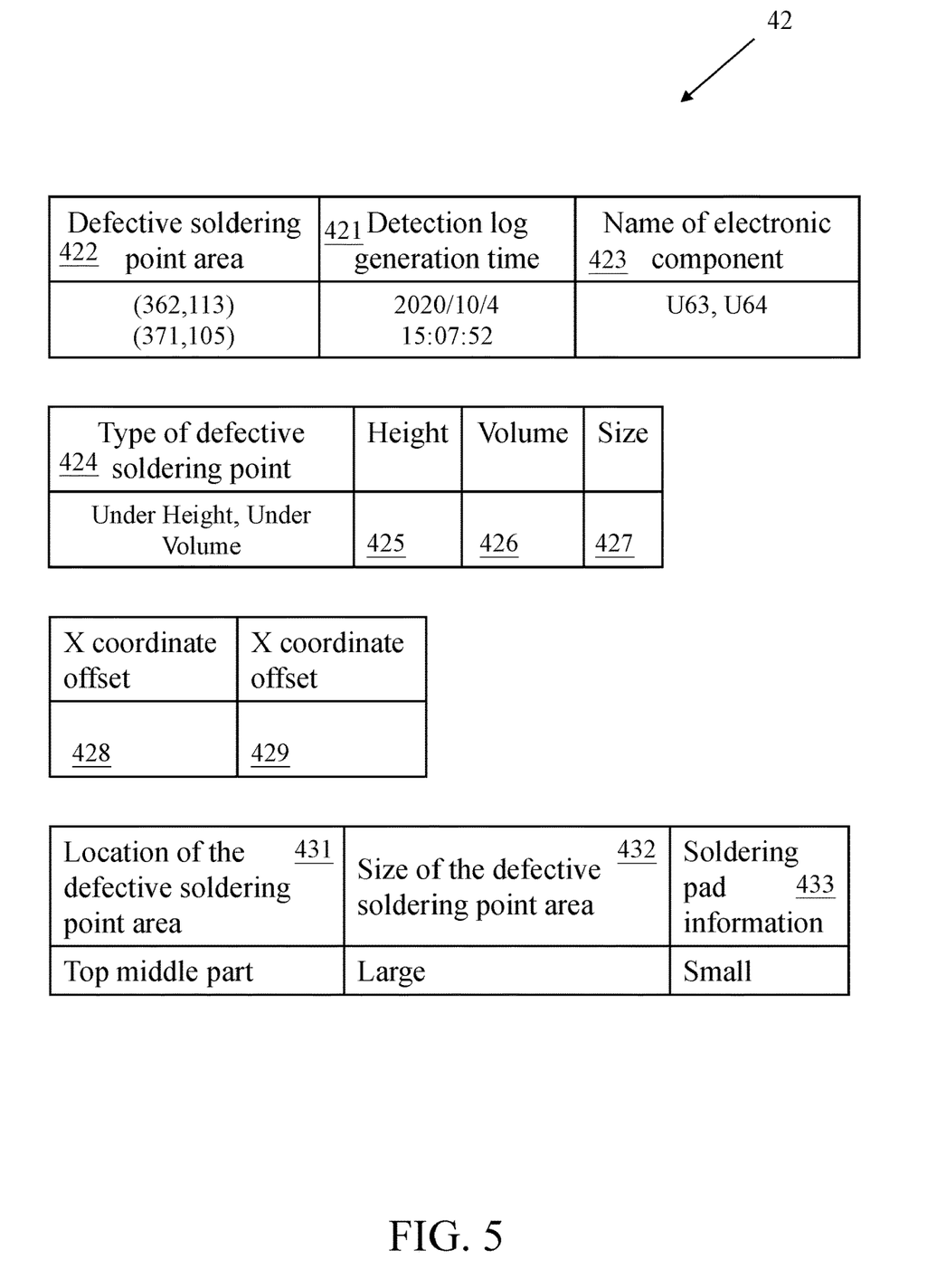
FIG. 5 is a schematic view of defective soldering point versus time analysis alert information generated in defective soldering point intensive extent analysis for solder paste inspection, according to the present invention.
Figure 6A:
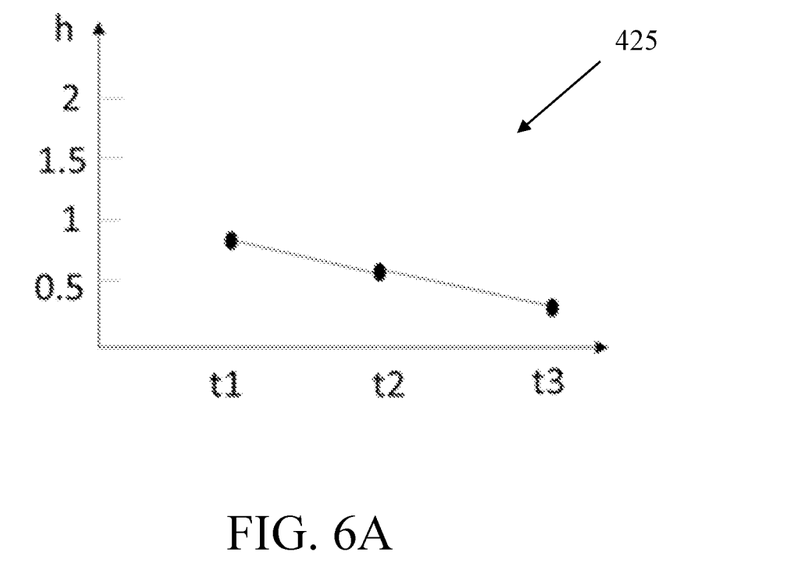
FIG. 6A is a height parameter of defective soldering point area versus time curve generated in defective soldering point intensive extent analysis for solder paste inspection, according to the present invention.
Figure 6B:
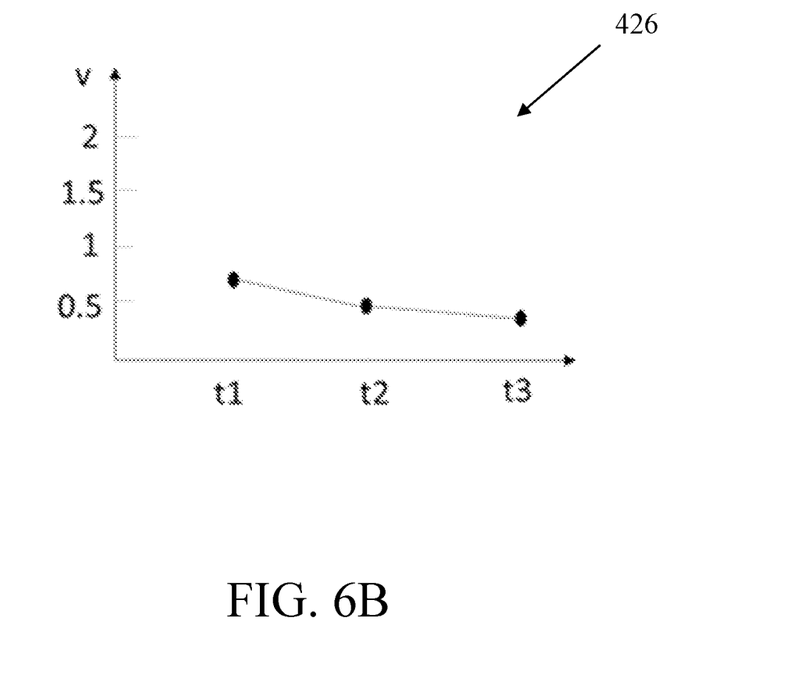
FIG. 6B is a volume parameter of defective soldering point area versus time curve generated in defective soldering point intensive extent analysis for solder paste inspection, according to the present invention.
Figure 6C:
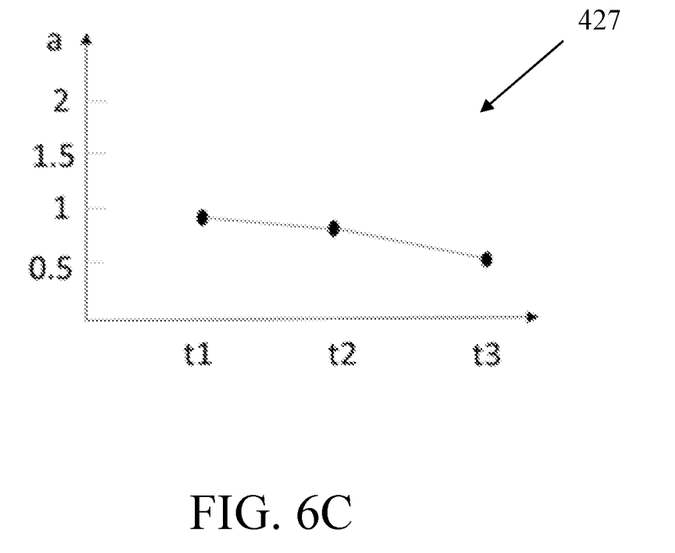
FIG. 6C is a size parameter of defective soldering point area versus time curve generated in defective soldering point intensive extent analysis for solder paste inspection, according to the present invention.
Figure 6D:
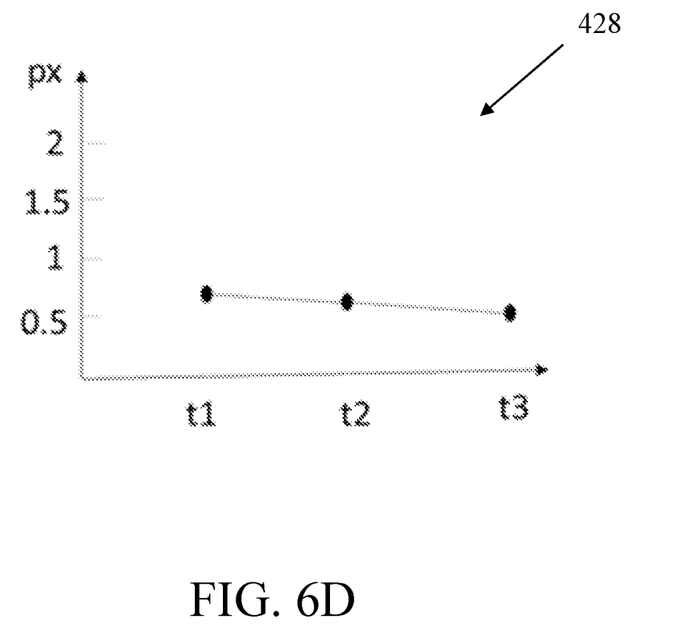
FIG. 6D is an X coordinate offset parameter of defective soldering point area versus time curve generated in defective soldering point intensive extent analysis for solder paste inspection, according to the present invention.
Figure 6E:
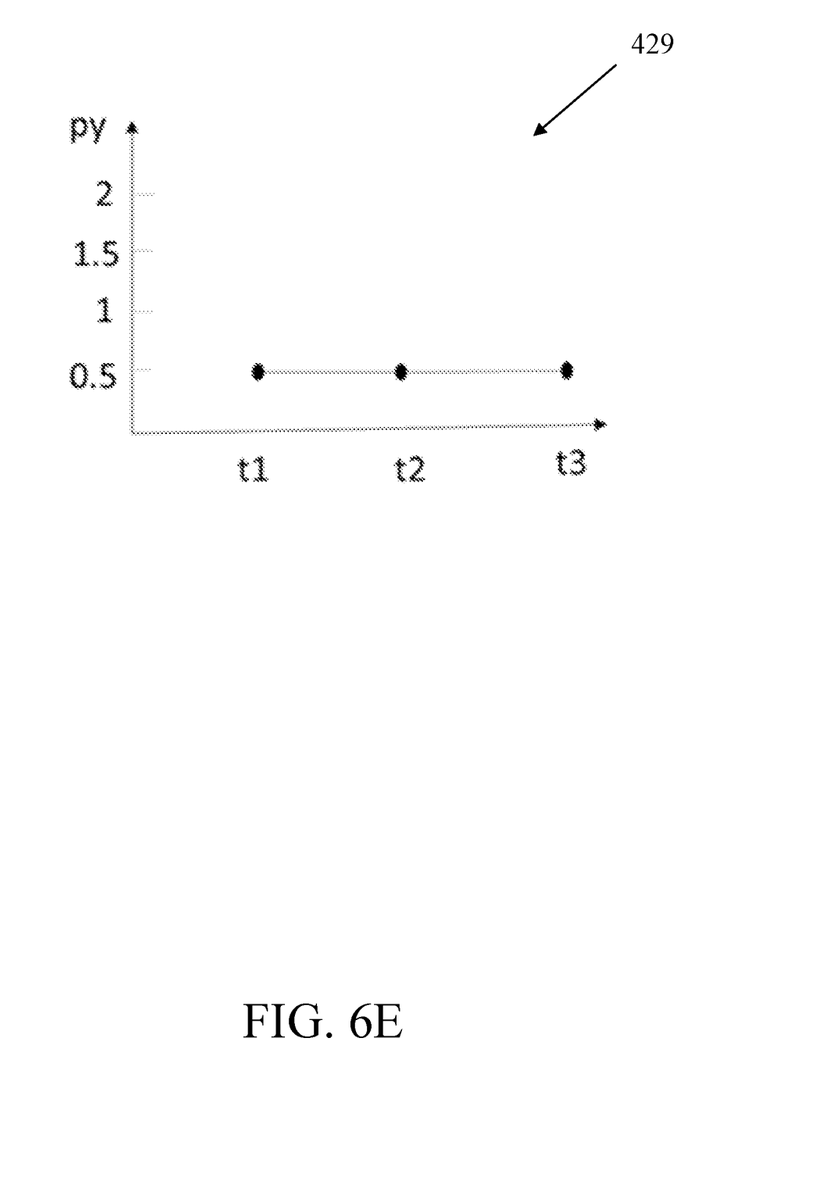
FIG. 6E is a Y coordinate offset parameter of defective soldering point area versus time curve generated in defective soldering point intensive extent analysis for solder paste inspection, according to the present invention.

As shown in FIG. 5, the defective soldering point versus time analysis alert information 42 includes the detection log generation time 421, the defective soldering point area 422, the name 423 of electronic component to be soldered on the defective soldering point area, the defective soldering point type 424, the height parameter of defective soldering point area versus time curve diagram 425 (as shown in FIG. 6A, which is a diagram showing a height parameter of defective soldering point area versus time curve diagram generated in the defective soldering point intensive extent analysis for the solder paste inspection according to the present invention), the volume parameter of defective soldering point area versus time curve diagram 426 (as shown in FIG. 6B, which is a diagram showing volume parameter of defective soldering point area versus time curve generated in the defective soldering point intensive extent analysis for the solder paste inspection, according to the present invention), the size parameter of defective soldering point area versus time curve diagram 427 (as shown in FIG. 6C, which is a diagram showing the size parameter of defective soldering point area versus time curve generated in the defective soldering point intensive extent analysis for the solder paste inspection, according to the present invention), the X coordinate offset parameter of defective soldering point area versus time curve diagram 428 (as shown in FIG. 6D, which is a diagram showing an X coordinate offset parameter of defective soldering point area versus time curve generated in the defective soldering point intensive extent analysis for solder paste inspection, according to the present invention), the Y coordinate offset parameter of defective soldering point area versus time curve diagram 429 (as shown in FIG. 6E, which is a Y coordinate offset parameter of defective soldering point area versus time curve generated in the defective soldering point intensive extent analysis for solder paste inspection, according to the present invention), the location 431 of the defective soldering point area, the size 432 of the defective soldering point area, and the soldering pad information 433. These examples are merely for exemplary illustration, and application field of the present invention is not limited thereto. By using the analysis module 27 of the defective soldering point intensive extent analysis system of the present invention to analyze and recognize the similar defective soldering point areas on the plurality of circuit boards in the defective soldering point versus time analysis alert information 42, the features of the defective soldering points in the defective soldering point area can be summarized to analyze the causes of the defective soldering points, and feed the causes back to the solder paste inspection 10.

As shown in FIGS. 6A to 6E, t1, t2 and t3 on the X axis are different detection log generation times 421, Y axis represents the height parameter, the volume parameter, the size parameter, the X coordinate offset parameter and Y coordinate offset parameter, respectively. The descriptions for the defective soldering point area location 431, the defective soldering point area size 432, and the soldering pad information 433 are similar to that of the location 414 of the defective soldering point area, the defective soldering point area size 415, and the soldering pad information 416, so the detailed descriptions are not repeated herein.

Figure 7:
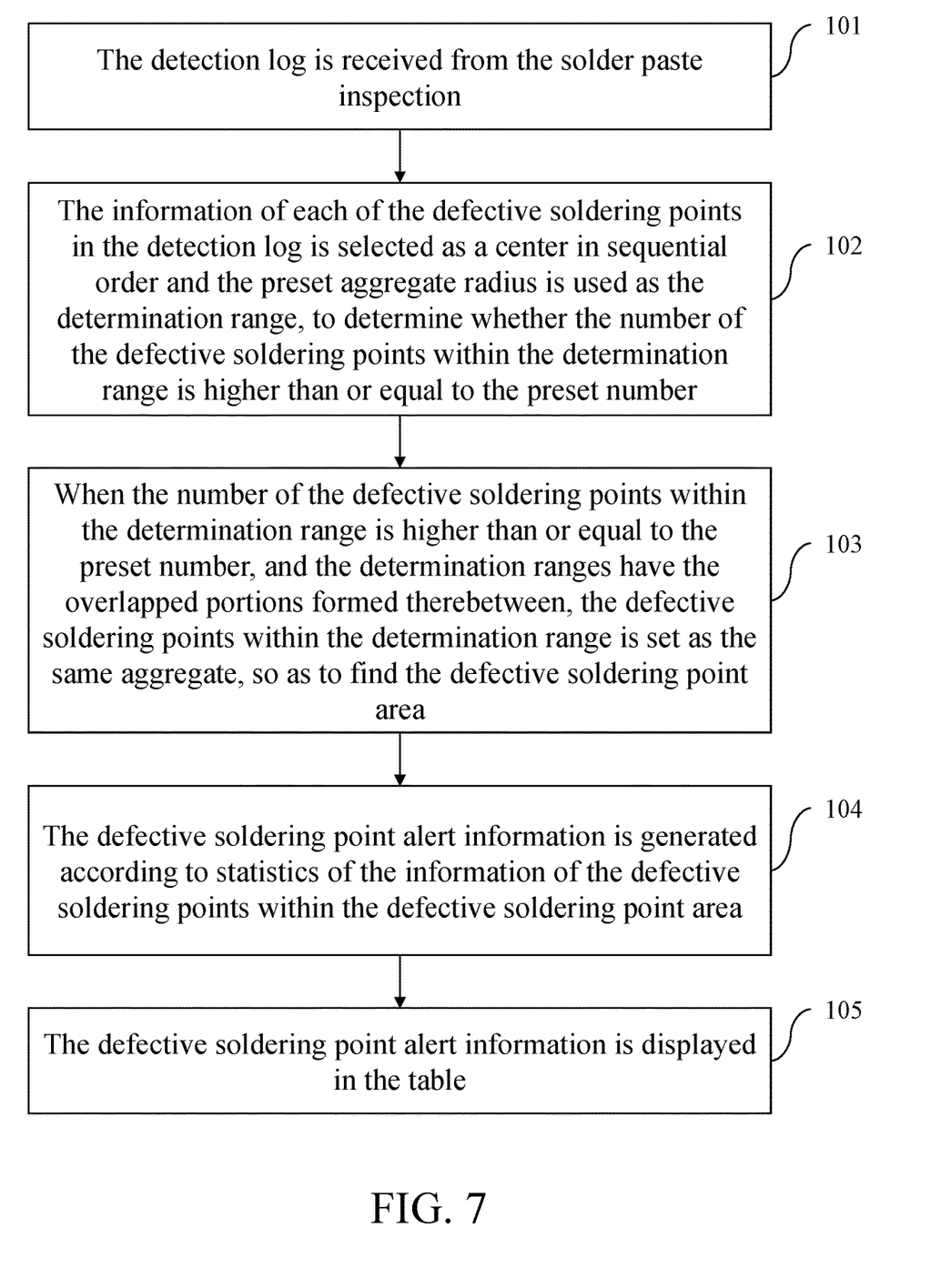
FIG. 7 is a flowchart of a defective soldering point intensive extent analysis method for solder paste inspection, according to the present invention.

The operation of the method of the present invention is illustrated in following paragraph with reference to FIG. 7. FIG. 7 is a flowchart of a defective soldering point intensive extent analysis method for solder paste inspection, according to the present invention.

First, in a step 101, the detection log is received from the solder paste inspection, and in a step 102, the information of each of the defective soldering points in the detection log is selected as a center in sequential order and the preset aggregate radius is used as the determination range, to determine whether the number of the defective soldering points within the determination range is higher than or equal to the preset number. Next, in a step 103, when the number of the defective soldering points within the determination range is higher than or equal to the preset number, and the determination ranges have the overlapped portions formed therebetween, the defective soldering points within the determination range is set as the same aggregate, so as to find the defective soldering point area. In a step 104, the defective soldering point alert information is generated according to statistics of the information of the defective soldering points within the defective soldering point area, and in a step 105, the defective soldering point alert information is displayed in the table.

According to the above-mentioned contents, the difference between the system and method of the present invention and the conventional technology is that in the present invention the solder paste inspection immediately detects the circuit board to generate the detection log after the circuit board is set with soldering paste, and the information of defective soldering points in the detection log is analyzed to determine the aggregate of defective soldering points set on the circuit board and find the at least one defective soldering point area, so as to generate and display the defective soldering point alert information according to statistics of the at least one defective soldering point area.

The technical solution of the present invention can solve the conventional technical problem that it is inconvenient to inspect and repair the unqualified circuit board determined by the immediately detect of the solder paste inspection, so as to achieve the technical effect of conveniently analyzing the defective soldering points on the circuit board for accurate repair.

The present invention disclosed herein has been described by means of specific embodiments. However, numerous modifications, variations and enhancements can be made thereto by those skilled in the art without departing from the spirit and scope of the disclosure set forth in the claims.

What is claimed is:

1. A defective soldering point intensive extent analysis system for a solder paste inspection, the defective soldering point intensive extent analysis system comprising:
the solder paste inspection being configured to immediately detect a circuit board to generate a detection log after the circuit board is set with soldering paste, the detection log comprises information of defective soldering points of the detected circuit board, the solder paste inspection stores soldering pad information corresponding to the detected circuit board, the soldering pad information comprises information of soldering point set areas; and
an analysis device, the analysis device comprising:
a receiving module configured to receive the detection log and the soldering pad information from the solder paste inspection;
an intensive extent analysis module configured to select one of the defective soldering points in the detection log as a center in sequential order, and use a preset aggregate radius as a determination range to determine whether the number of the defective soldering points within the determination range is higher than or equal to a preset number;
an aggregate module configured to set the defective soldering points corresponding to the determination ranges as the same aggregate to calculate at least one defective soldering point area when the number of the defective soldering points within the determination range is higher than or equal to the preset number and the determination ranges have overlapped portions formed therebetween;
a determination module configured to determine whether similar defective soldering point areas exist in successive N detection logs;
a generation module configured to generate defective soldering point alert information according to statistics of the information of defective soldering points within the at least one defective soldering point area, a location and a size of the at least one defective soldering point area, and the soldering pad information and generate defective soldering point versus time analysis alert information according to statistics of the information of defective soldering points based on times of generating the N detection logs, a location and a size of the at least one defective soldering point area, and the soldering pad information when the determination module determines that the similar defective soldering point areas exist in the successive N detection logs, wherein N is a positive integer higher than or equal to 2;
an analysis module configured to analyze and recognize the similar defective soldering point areas occurred on the plurality of circuit boards in the defective soldering point versus time analysis alert information, summarize the features of the defective soldering points in the at least one defective soldering point area, analyze causes of the defective soldering points, and feed the causes back to the solder paste inspection; and
a display module configured to display the defective soldering point alert information in a table.

2. The defective soldering point intensive extent analysis system according to claim 1, wherein the aggregate module finds the at least one defective soldering point area according to coordinate positions of the defective soldering points in the aggregate, the generation module calculates the size of the at least one defective soldering point area according to the coordinate positions within the at least one defective soldering point area.

3. The defective soldering point intensive extent analysis system according to claim 1, the analysis module configured to perform analysis and recognition on the at least one defective soldering point area in the defective soldering point alert information, summarize features of the defective soldering points in the at least one defective soldering point area, analyze causes of the defective soldering points, and feed the causes back to the solder paste inspection.

4. The defective soldering point intensive extent analysis system according to claim 1, wherein the intensive extent analysis module defines the defective soldering point as a noise point and delete the defective soldering point when the intensive extent analysis module determines the position of the defective soldering point within the determination range does not match the information of the soldering point set areas contained in the soldering pad information.

5. A defective soldering point intensive extent analysis method for a solder paste inspection, the defective soldering point intensive extent analysis method comprising:
the solder paste inspection immediately detects a circuit board to generate a detection log after the circuit board is set with soldering paste, the detection log comprises information of defective soldering points of the detected circuit board, the solder paste inspection stores soldering pad information corresponding to the detected circuit board, the soldering pad information comprises information of soldering point set areas;
an analysis device configured to receive the detection log and the soldering pad information from the solder paste inspection;
the analysis device configured to select one of defective soldering points in the detection log as a center in sequential order, and using a preset aggregate radius as a determination range to determine whether the number of the defective soldering points within the determination range is higher than or equal to a preset number;
the analysis device configured to set the defective soldering points corresponding to the determination range as the same aggregate to calculate at least one defective soldering point area when the number of the defective soldering points within the determination range is higher than or equal to the preset number and the determination ranges have overlapped portions formed therebetween;
the analysis device configured to determine whether similar defective soldering point areas exist in successive N detection logs;
the analysis device configured to generate defective soldering point alert information according to statistics of the information of defective soldering points within the at least one defective soldering point area, a location and a size of the at least one defective soldering point area, and the soldering pad information;

the analysis device configured to generate defective soldering point versus time analysis alert information according to statistics of the information of defective soldering points based on times of generating the N detection logs, a location and a size of the at least one defective soldering point area, and the soldering pad information when the determination module determines that the similar defective soldering point areas exist in the successive N detection logs, wherein N is a positive integer higher than or equal to 2;

the analysis device configured to analyze and recognize the similar defective soldering point areas occurred on the plurality of circuit boards in the defective soldering point versus time analysis alert information, summarize the features of the defective soldering points in the at least one defective soldering point area, analyze causes of the defective soldering points, and feed the causes back to the solder paste inspection; and displaying the defective soldering point alert information in a table.

6. The defective soldering point intensive extent analysis method according to claim 5, wherein the step of the analysis device configured to set ones of the defective soldering points corresponding to the determination range as the same aggregate to find at least one defective soldering point area comprises:

the analysis device configured to find the at least one defective soldering point area according to coordinate positions of the defective soldering points within the same aggregate; and the analysis device configured to calculate the size of the at least one defective soldering point area according to the coordinate positions of the at least one defective soldering point area.

7. The defective soldering point intensive extent analysis method according to claim 5, wherein the step of the analysis device configured to analyze and recognize the at least one defective soldering point area in the defective soldering point alert information comprises:

the analysis device configured to summarize features of the defective soldering points within the at least one defective soldering point area, to analyze causes of the defective soldering points and feed the causes back to the solder paste inspection.

8. The defective soldering point intensive extent analysis method according to claim 5, further comprising:

the analysis device configured to define the defective soldering point as a noise point and deleting the defective soldering point when a position of the defective soldering point within the determination range is determined to not match the soldering point set area information of the soldering pad information.

\* \* \* \* \*